US008641028B2

(12) United States Patent
Curry et al.

(10) Patent No.: US 8,641,028 B2
(45) Date of Patent: Feb. 4, 2014

(54) SLIDING TOOL FOR INSERTION OF A LOCKING STRIP INTO A CHANNEL FOR SEALING THE EDGE OF A FILM

(76) Inventors: Walter John Curry, Winnipeg (CA); Michael Francis Curry, Winnipeg (CA)

(*) Notice: Subject to any disclaimer, the term of this patent is extended or adjusted under 35 U.S.C. 154(b) by 468 days.

(21) Appl. No.: 12/689,265

(22) Filed: Jan. 19, 2010

(65) Prior Publication Data

US 2011/0175275 A1 Jul. 21, 2011

(51) Int. Cl.
*B25B 1/24* (2006.01)
*B23P 19/02* (2006.01)

(52) U.S. Cl.
USPC .... 269/257; 29/243.5; 29/243.54; 29/243.56; 29/243.57

(58) Field of Classification Search
USPC ......... 29/243.5, 243.54, 243.56, 243.57, 235; 53/550, 555, 258
See application file for complete search history.

(56) References Cited

U.S. PATENT DOCUMENTS

| | | | | |
|---|---|---|---|---|
| 3,505,725 A | | 4/1970 | Curry | |
| 3,893,212 A | | 7/1975 | Curry | |
| 3,999,258 A | | 12/1976 | Curry | |
| 4,172,313 A | * | 10/1979 | Takahashi | 29/235 |
| 5,735,032 A | * | 4/1998 | Stone | 29/235 |
| 5,979,036 A | * | 11/1999 | Socci et al. | 29/451 |

* cited by examiner

*Primary Examiner* — Lee D Wilson
*Assistant Examiner* — Seahee Yoon
(74) *Attorney, Agent, or Firm* — Adrian D. Battison; Ade & Company Inc.

(57) ABSTRACT

A holding assembly for an edge of a flexible film sheeting where the assembly comprises an elongate flexible channel member for extending along the edge and an elongate locking strip detachably engagable within the channel member for clamping the associated film sheeting therebetween has the locking strip moved into place by a guide body arranged for sliding movement across a support surface such as the ground on which the film sheeting is located. The guide body having a slot therein for receiving the channel member and carries a pivotal lever including a pair of rollers for guiding and forcing the locking strip into place. The guide body is carried on a skid and moves underneath the edge of the film across the width of the opening to be closed.

10 Claims, 6 Drawing Sheets

SLIDING TOOL FOR INSERTION OF A LOCKING STRIP INTO A CHANNEL FOR SEALING THE EDGE OF A FILM

This invention relates to a sliding tool for insertion of a locking strip into a channel for sealing the edge of a film.

BACKGROUND OF THE INVENTION

Devices for sealing the edge of a sheet of plastics film or the like are shown in U.S. Pat. No. 3,505,725 issued Apr. 14, 1970; in U.S. Pat. No. 3,893,212 issued Jul. 8, 1975 and in U.S. Pat. No. 3,999,258 issued Dec. 28, 1976 all by Walter Curry one of the inventors herein.

In each of these devices there is shown a channel member which has a longitudinal channel extending along a length of the channel member and a locking strip which can be inserted into the channel and engaged under side edges of the channel so that the locking strip is held in place. The locking strip is slightly loose within the channel so that one or more sheets of plastic film can be engaged into the channel and underneath the locking strip so as to be held in place between the locking strip and the channel.

This arrangement is used in many different circumstances. In one particular end use, the arrangement is used to seal together two overlying sheets of the plastic material so as to form a seam therebetween. This is particularly useful for closing the ends of large bags for example the very tubular bags used for storing silage in the field. However very many other uses are available for an arrangement where two overlying sheets of plastic film are fastened together?

One difficulty in using the locking system disclosed in the above patents is that of inserting the locking strip into the channel member, particularly when the channel member and the locking strip are relatively large and therefore relatively stiff in order to engage and seal the relatively thick plastics material necessary for large bags.

U.S. Pat. No. 3,893,212 shows two different arrangements of tool which can be used to insert the locking strip into the channel. In one arrangement the channel is generally symmetrical on each side so that the locking strip is bent inwardly at its edges to tuck into the channel. In an alternative arrangement the channel is stiffer and more containing on one side allowing the locking strip to be inserted into that side following which the other side of the locking strip is tucked under a softer more pliable edge piece of the channel member.

Typically when using even the larger arrangements of this type, a rolling tool or wheel somewhat similar to that shown in FIGS. 3 and 4 of the above U.S. patent is used to engage the edge of the locking strip to push it into place. This is a hand operated tool which slides along or rolls along the locking strip. In a situation where it is necessary to close a large bag, it is necessary for the user to crawl along the edge of the bag pushing the tool along the locking strip while holding the locking strip in the required position. This is sufficiently difficult that it has led to some resistance to use of a system of this type thus reducing potential sales and thus reducing the possibility for the user to utilize the effective sealing action of a device of this type.

In some cases therefore, in the field, the ends of such large bags are closed by simple crude mechanisms using wooden strips and the like which are rolled at the edge of the bag. This crude system is sometimes used in replacement for the effective sealing action of the device of the above type in view of the difficulty of the installation.

It is one object of the present invention, therefore to provide a tool which can be used to more effectively insert the locking strip into the channel member in an arrangement of this type.

SUMMARY OF THE INVENTION

It is one object of the invention to provide a sliding tool for insertion of a locking strip into a channel for sealing the edge of a film.

According to one aspect of the invention there is provided an apparatus for use with a clamping and holding assembly for an edge of a flexible film sheeting where the assembly comprises an elongate flexible channel member for extending along the edge and an elongate locking strip detachably engagable within said channel member for clamping the associated film sheeting therebetween, the apparatus comprising:

a guide body arranged for movement across a support surface on which the film sheeting is located;

the guide body having a slot therein for receiving the channel member;

the guide body carrying a guide member including a first guide element for guiding the locking strip to the channel member so that one side edge enters an adjacent edge of the channel member and a second guide element for forcing the opposite side edge of the locking strip into the channel member;

the guide body being movable along the support surface with the channel member in the slot so as to move along the channel member and to guide the locking strip into the channel member as the guide body moves relative to the channel member and the locking strip.

Preferably the guide body has a bottom skid for sliding across the surface for sliding on soil or other rough surfaces where wheels are ineffective. Alternatively the guide body may include wheels to roll over a smooth surface such as concrete.

Preferably the skid passes underneath the film sheeting.

Preferably the guide body includes a flat bottom surface so as to lie flat on the surface.

Preferably the guide member comprises a lever which is mounted on the guide body for pivotal movement about an axis generally parallel to the surface and transverse to the direction of movement.

Preferably the lever is mounted on the guide body for pivotal movement about a forward end of the lever.

Preferably the guide body includes a wall at right angles to the surface on which the lever is mounted for the pivotal movement.

Preferably the first and second guide elements each comprise a wheel mounted on the guide body for rolling movement along the locking strip.

Preferably each of the wheels includes a peripheral recess adjacent a center of the wheel for receiving and guiding a center bead on the locking strip.

Preferably the wheel forming the first guide element includes a first surface on the first side of the recess arranged to guide the first respective side edge of the locking strip into the channel and a second surface on the opposite side of the locking strip which is chamfered away from the channel member to allow the second respective side to remain free of the channel member.

Preferably the wheel forming the second guide element includes a forcing surface on the side of the recess to force the second respective side of the locking strip into the second side of the channel member.

Preferably the guide body includes an insert guide surface into which the locking strip enters and by which the locking strip is guided as it moves into engagement with the guide body and the guide members thereon.

Preferably the receptacle comprises a hook.

Preferably the guide body includes a receptacle along its length on one side of the slot for receiving an edge of the film sheeting projecting beyond the channel member.

Preferably the receptacle has a mouth underneath the guide member through which the edge of the film sheeting projects.

According to a second aspect of the invention there is provided a method for clamping an edge of a flexible film comprising;

placing the edge across an elongate flexible channel member extending along the edge;

inserting an elongate locking strip within the channel member for clamping the associated film sheeting therebetween;

wherein the locking strip is inserted by providing a guide body arranged for movement across a support surface on which the film sheeting is located;

the guide body having a slot therein for receiving the channel member;

the guide body carrying a guide member including a first guide element for guiding the locking strip to the channel member so that one side edge enters an adjacent edge of the channel member and a second guide element for forcing the opposite side edge of the locking strip into the channel member;

and moving the guide body along the support surface with the channel member in the slot so as to move along the channel member and to guide the locking strip into the channel member as the guide body moves relative to the channel member and the locking strip.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 7:
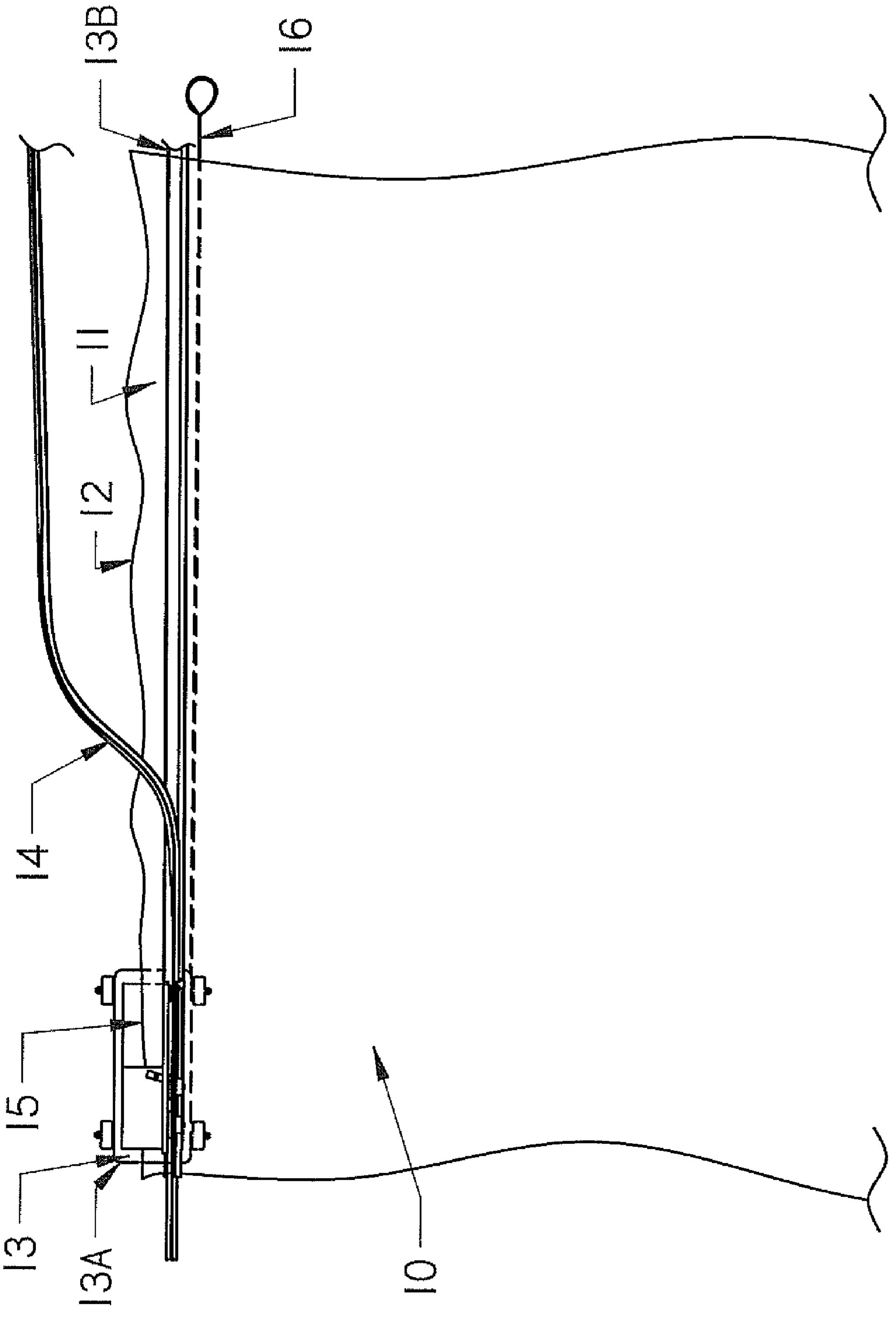
FIG. 7 is a top plan view of a bag where the end edges of the bag are sealed using the tool of FIG. 1.

In FIG. 7 is shown a bag 10 with overlying sheets 11 at an edge 12 of the bag to be closed. The bag is closed using the channel member and locking strip of the construction shown in the above patents. The channel 13 has a length so that it extends fully across the width of the sheets 11 from a first end 13A at one side to a second end 13B at the other side. The channel is cut to length from an extruded strip supplied in roll form and the length is selected so that it matches the length of the bag to be closed. Similarly, a locking strip portion 14 is arranged of a common length with the channel member so that the locking strip can be inserted into the channel member thus pinching the two overlying sheets of the bag together adjacent the edge 12. The channel member and the locking strip are spaced slightly inwardly from the edge 12 so that a portion of the edge hangs outwardly beyond the channel member to ensure that the channel member receives and contains a complete portion of the two strips and acts to pinch the two strips between the channel member and the locking strip at both side edges of the locking strip to ensure that it is properly held in place.

In general, in the arrangement shown in FIG. 7, the channel member is located underneath the sheets to be joined adjacent the edge 12 and a joining tool generally indicated at 15 is engaged with the channel member. The tool is located underneath the channel member and underneath the sheets and the locking strip is applied from above and inserted by the tool into the channel member. The tool 15 has a length of the order of 12 inches so that it can work on the locking strip over a short portion of locking strip so as to insert that portion of the locking strip into the channel member. The insertion tool 15 can then be pulled across underneath the sheets 11 by a pull cable 16 at one side. Alternatively the tool can be pushed from the other side by an attached push rod, particularly in a situation where the tool needs to be more accurately guided or where there is a tendency to wander from a required straight line.

It is of course necessary to locate the channel member in the required position so that it is held stationary and prevented from movement as the pulling action occurs. This can be done by attaching the channel member to a suitable locating element such as a wooden component or to the ground itself so that the channel member is fixed in place with the sheets allowing the tool to be pulled along the channel member. Some attention is necessary also to take into account the tendency of the channel member to twist as it is generally unwound from a roll of the material and therefore has a tendency to take a big curvature when laid on the ground.

It will be appreciated that the discussion herein is directed primarily to the sealing of large bags in an agricultural situation so that the components are placed on the ground but of course the use of the tool herein in other locations is possible where the underlying surface is different and the dimensions involved may also be significantly different both larger and smaller but in relation to the tool itself and in relation to the channel member and locking strip.

Figure 1:
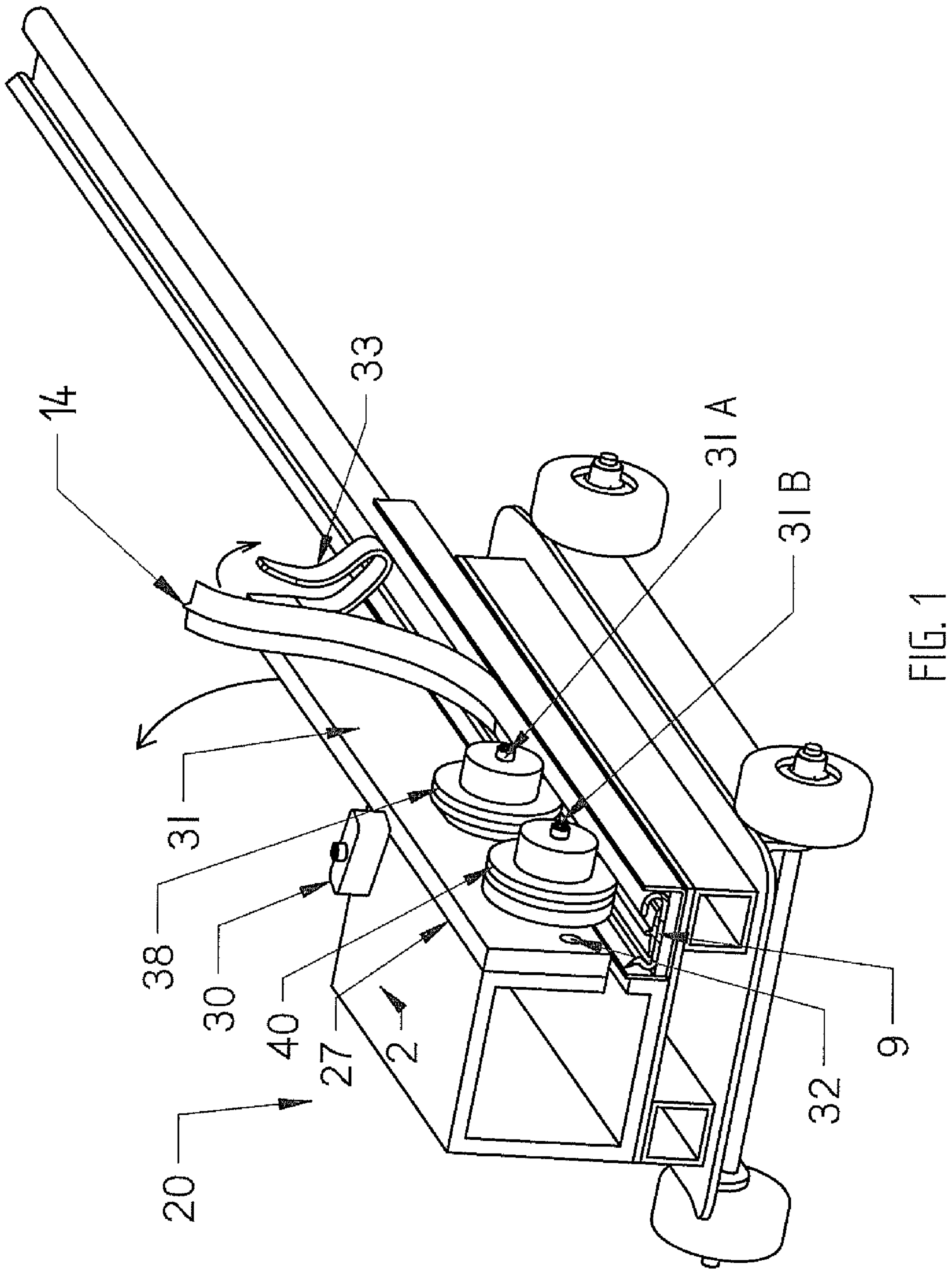
FIG. 1 is an isometric view of the tool according to the present invention including the channel member and the locking strip in a position of operation of the tool.
Figure 2:
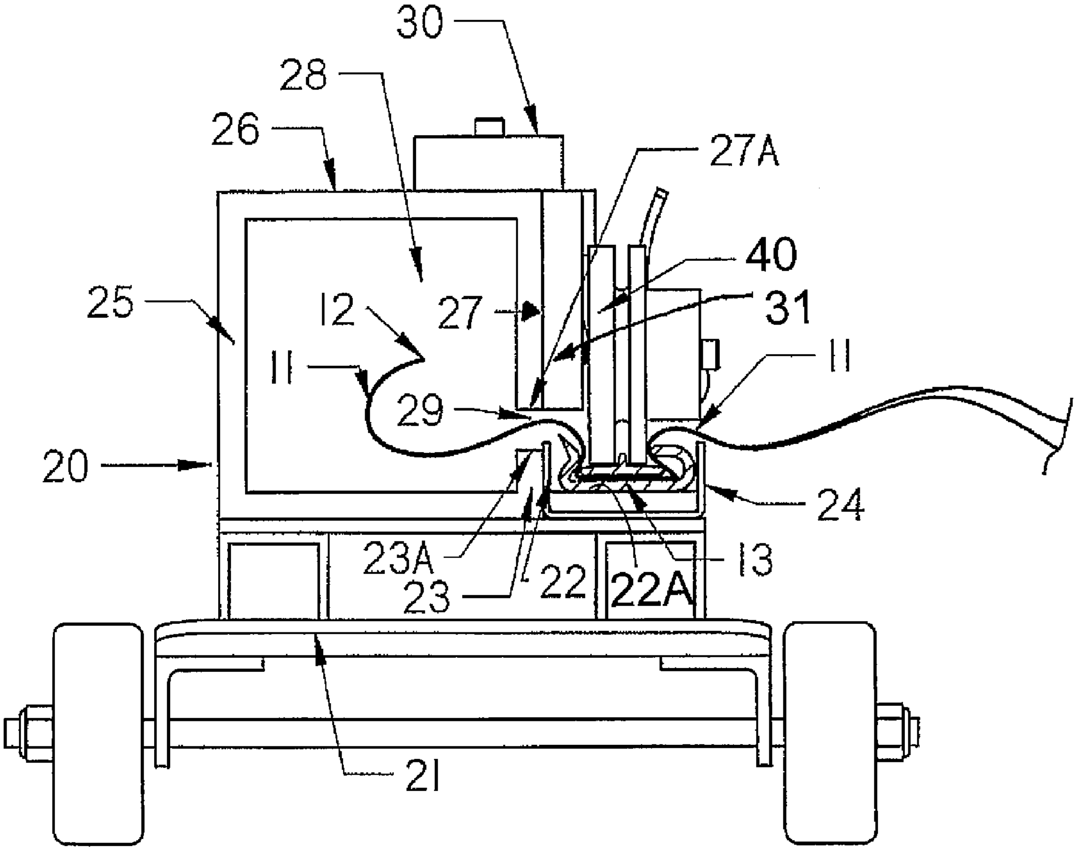
FIG. 2 is a vertical cross section along the lines 2-2 of FIG. 1.
Figure 5:
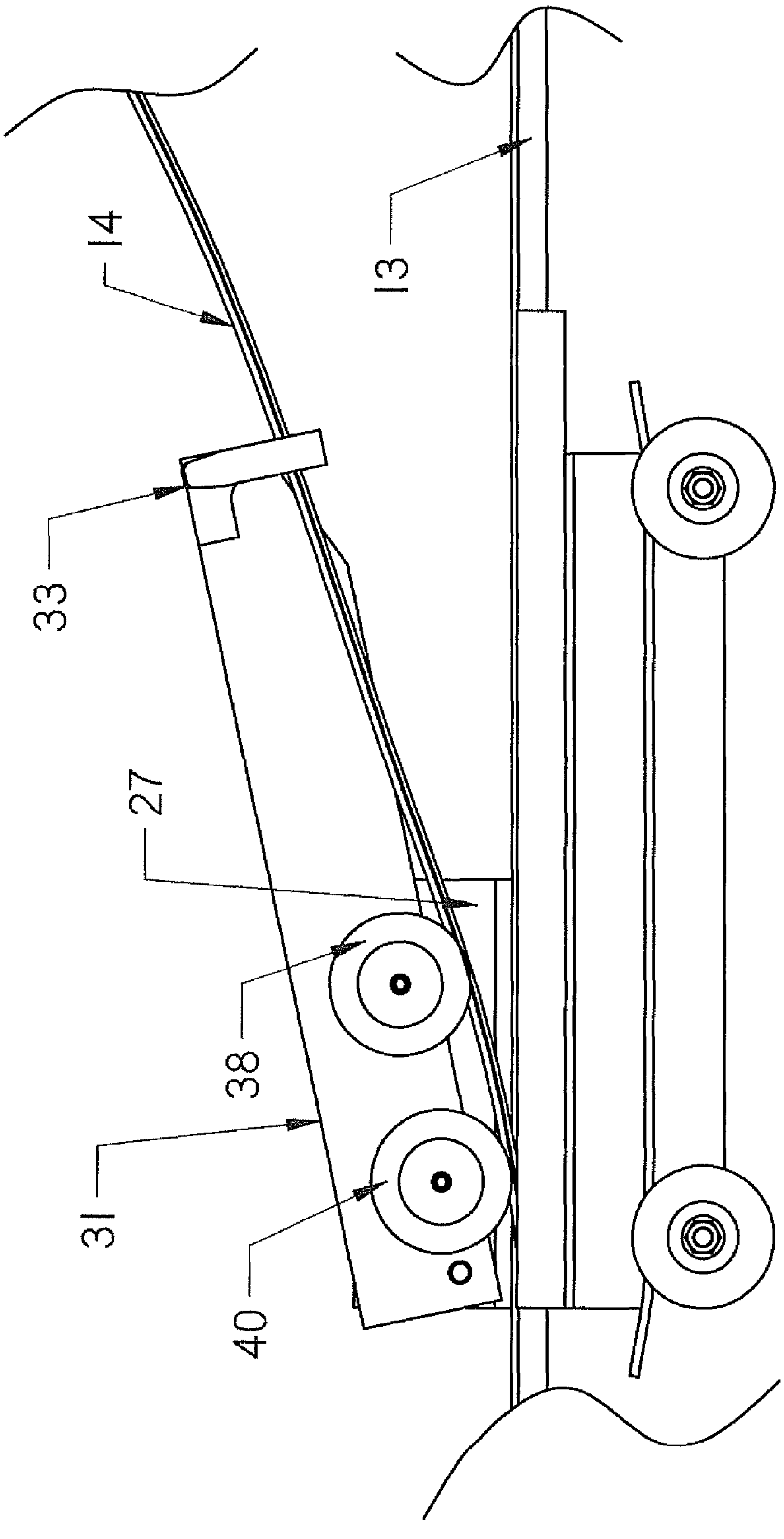
FIG. 5 is a front elevational view of the tool of FIG. 1.

Turning now to the tool itself shown best in FIGS. 1, 2 and 5, the tool comprises a guide body 20 which has a bottom skid plate 21 for sliding over the surface or the ground. Additional components, such as guide wheels to assist in the sliding action may be provided in accordance with the knowledge of the person well skilled in this art.

The body provides a slot 22 for receiving the channel member defined by an elongate base 22A and a pair of upstanding side walls 23 and 24. The slot has a width sufficient to receive the channel member with side to side freedom to move. The sheets 11 can be laid over the top of the side walls 23 and 24 and across the top of the channel member 13 within the slot. The guide body further includes a further upstanding wall 25 parallel to the walls 23 and 24 and spaced behind the wall 23. At the top of the wall 25 which rises to the height above the top of the walls 23 and 24 is provided a horizontal top plate 26 which attaches to a depending wall 27 extending downwardly from a top plate 26 to a position closely adjacent the top of the upstanding wall 23. The walls 25, 26 and 27 thus define a receptacle 28 with a hollow interior and also define a slot 29 between the bottom edge 27A of the depending wall 27 and the top edge 23A of the wall 23. The hollow receptacle 28 can readily receive and contain the edge portion of the sheets 11 adjacent the edge 12.

The tool 2 provides the above components in an arrangement longitudinal and can be manufactured for example as an extrusion so that the walls defined are continuous along the length of the structure.

On the depending wall 27 is provided a lever 31. As best shown in FIG. 1, this is mounted on a pivot pin 32 at the forward end of the lever adjacent one end of the tool. The pin 32 attaches the lever to the wall 27 and thus defines a pivot axis which is at right angles to the tool and parallel to the ground.

Figure 6:
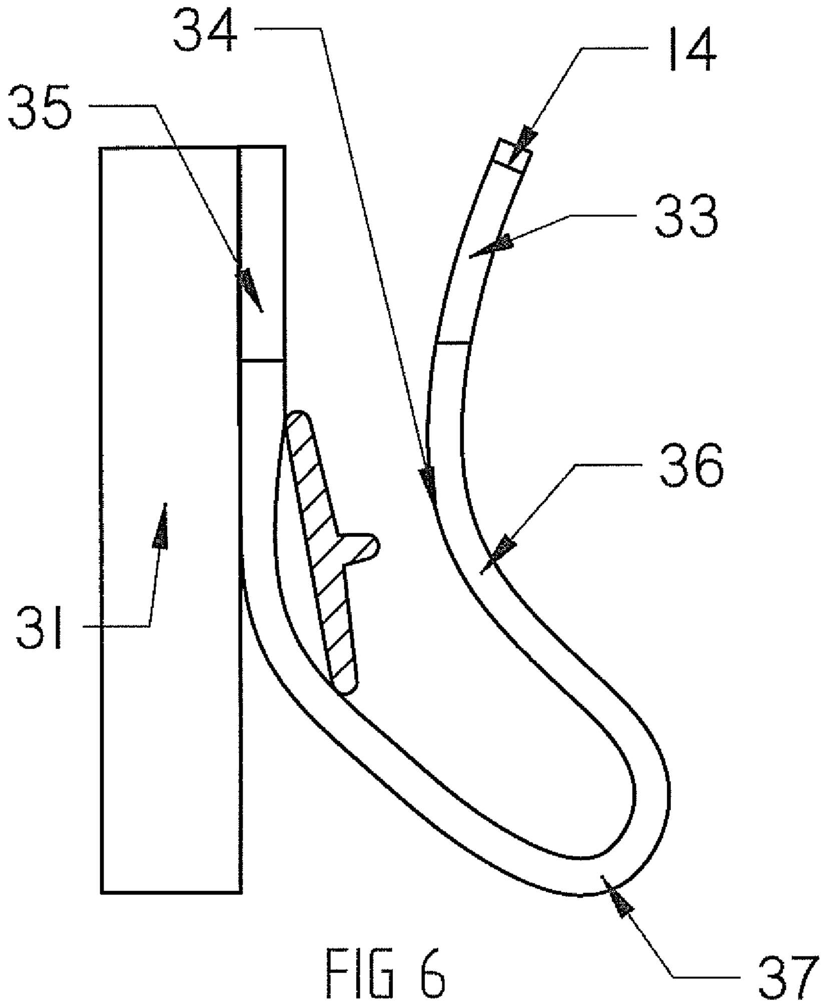
FIG. 6 is a cross sectional view showing the position of the locking strip in the first guide element of the tool.

The lever 31 carries three components for guiding and directing the locking strip 14. The first component 33 forms a hook as best shown in FIG. 6 where the hook defines a channel shape receptacle 34 between two legs 35 and 36 connected by a U-shaped base 37. This channel shape receptacle formed in the hook thus receives and guides the locking strip 14 so that it is properly oriented as it moves toward the forward end of the tool in the locking action.

The lever 31 can be lifted by pivoting about the pin 32 to allow the strip to be threaded into position and then lowered to commence the pressing and insertion action. In the lowered position, there is a latch 30 holding the lever in place so that it remains lowered as the tool is moved.

Figure 4:
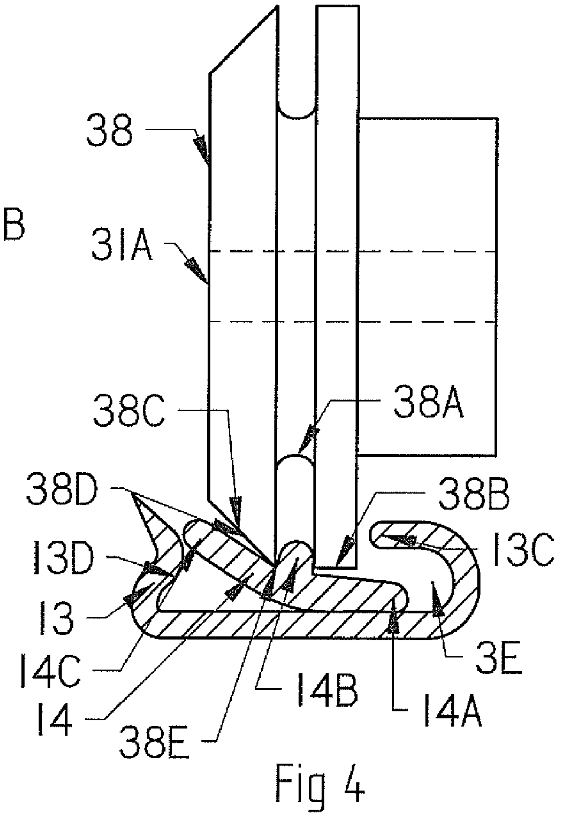
FIG. 4 is a similar cross sectional view to that of FIG. 3 showing the first insertion wheel.

The second component of the locking system as best shown in FIG. 4 provides a roller wheel 38 which acts to provide initial guidance of the locking strip so as to insert the locking strip into the channel member.

As explained in the previous patents, the channel member includes two side edges 13C and 13D. The side edge 13C forms a receptacle portion 13E into which the side edge 14A of the locking strip can be inserted. This side of the channel member is relatively stiff and is not intended to be flexed during the insertion of the locking strip. Thus the edge 14A of the locking strip is inserted firstly under the lip defined by the side 13C so that edge slides underneath that lip and engages the strips of material forcing the strips toward that end of the channel member.

In order to effect this movement, the wheel 38 includes a central peripheral recess 38A which receives a bead 14B on the top of the locking strip at a position adjacent the center of the locking strip. Thus the locking strip is received on the guide wheel and is located side to side by the engagement of the bead 14B into the recess 38A. On the side of the wheel 38A adjacent the side 13C of the channel member is provided a rib 38B which engages the portion of the locking strip adjacent the side 13C and acts to insert that side of locking strip into its position underneath the side 13C at that lip. On the other side of the recess 38A is provided a rib 38C which has a chamfered surface 38D recessed away from the channel member so as to form a nose portion 38E which engages the locking strip and a side 38D which extends outwardly toward the side 13D and radially inwardly toward the wheel. Thus the side 14C of the locking strip is allowed to remain out of the channel member during the engagement with the wheel 38. In this way the locking strip is guided so that it enters under the side 13C but remains outside the side 13D.

Figure 3:
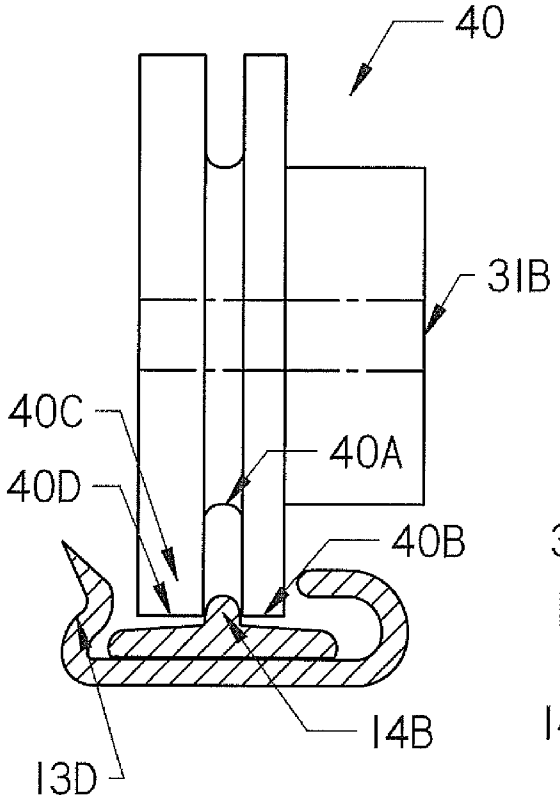
FIG. 3 is an enlarged cross sectional view of a part only of the structure of FIG. 2 showing the second insertion wheel.

Turning now to FIG. 3, the final guide element is indicated at 40 and comprises a further wheel similarly shaped to the guide wheel 38. Thus the guide wheel includes a recess 40A and two ribs 40B and 40C.

Both of the wheels are mounted on the lever for rotation around an axle 31A and 31B on the lever. However the guide wheels are held in position fixed relative to the side wall 27 during the insertion action.

The lever 31 is pivotal relative to the side wall 27 in an initial setting position so as to fit the guide elements 33, 38 and 40 out of engagement with the locking strip for ready insertion of the lead end of the locking strip into the channel member. However after this insertion is completed, the lever 31 is moved downwardly and locked in place so that the hook guide 33 remains in position adjacent the channel member and the wheels 38 and 40 are located at the required position so their peripheral surfaces engage the locking strip and force it into the positions shown in FIGS. 3 and 4.

The wheel 40 as shown in FIG. 3 has a rib 40C similarly positioned to the rib 38C but in this case the rib 40C is not chamfered but instead provides a cylindrical outer surface 40D which engages the top surface of the locking strip at the side 13D and pushes it downwardly past the flexing side lip 13D into the channel member.

Thus the three guide elements act to accurately guide and direct the locking strip to the required location and then to force the locking strip into the channel member as the channel member passes along the slot caused by the movement of the tool across the width of the bag and along the channel member.

In this way the tool can be simply placed into its required location under the edge of the bag and the tool can be rapidly pulled across the bag to effect the sealing action.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for clamping and holding an edge of a flexible film sheeting comprising:

an assembly for clamping and holding the edge which comprises:

an elongate flexible channel member for extending along the edge;

the channel member having a bottom wall with a bottom surface and a first and a second upstanding sides;

and an elongate locking strip detachably engagable within said elongate flexible channel member for clamping the associated film sheeting therebetween, the elongate locking strip having;

and a tool for engaging the elongate locking strip into the elongate flexible channel member comprising:

a guide body having a bottom portion arranged for movement across a support surface on which the film sheeting is located;

the guide body having a guide slot therein in which the elongate flexible channel member is received;

the guide slot having an elongate base engaging and supporting the bottom surface of the elongate flexible channel member lying along the elongate base and first and second upstanding side walls of the guide slot engaging and locating said first and second sides of the elongate flexible channel member to hold the elongate flexible channel member extending along the guide slot;

the guide slot being located above the bottom portion with the upstanding side walls extending upwardly away from the bottom portion and held relative to the bottom portion so that the elongate base of the guide slot is held by the guide body generally parallel to the support surface over which the guide body moves;

the guide body carrying a lever mounted on the guide body for pivotal movement about a forward end of the lever so that a rearward end of the lever can move toward and away from the elongate base of the guide slot in a direction generally at right angles to the elongate base between a raised position of the lever and a lowered operating position of the lever;

the lever carrying a first guide element at a position above the guide slot engaging and guiding the locking strip into the guide slot so that the locking strip is guided to enter the channel member lying in the guide slot;

the first guide element being shaped so that the first side edge of the locking strip is guided by the first guide element to enter an adjacent the first side of the channel member;

the lever carrying a second guide element at a position above the guide slot engaging and guiding the locking strip into the guide slot so that the locking strip is guided to enter the channel member lying in the guide slot;

the second guide element being shaped so that the second side edge of the locking strip is guided by the second guide element to enter the second side of the channel member;

the first guide element comprising a pair of legs defining a channel shape receptacle therebetween receiving the locking strip in the channel shape receptacle, with the legs defining the channel shape receptacle at an angle to the elongate base of the guide slot;

the second guide element comprising at least one wheel with a peripheral surface of said at least one wheel extending, when the lever is in the lowered operating position of the lever, into the guide slot to a position within the guide slot between the first and second upstanding side walls of the guide slot;

the guide body being movable along the support surface with the channel member lying in the guide slot so that the guide body moves along the channel member;

the locking strip thus being inserted to lie within the channel member after the guide body has moved along the channel member relative to the channel member and the locking strip.

2. The apparatus according to claim 1 wherein the guide body has a bottom skid for sliding across the surface.

3. The apparatus according to claim 2 wherein the skid passes underneath the film sheeting.

4. The apparatus according to claim 1 wherein the guide body includes a bottom skid surface so as to lie flat on the surface.

5. The apparatus according to claim 1 wherein the guide body includes a wall at right angles to the surface on which the lever is mounted for the pivotal movement.

6. The apparatus according to claim 1 wherein said at least one wheel comprises a first and a second wheel mounted on the guide body for rolling movement along the locking strip.

7. The apparatus according to claim 6 wherein each of the wheels includes a peripheral recess adjacent a center of the wheel for receiving and guiding a center bead on the locking strip.

8. The apparatus according to claim 7 wherein the first wheel includes a first surface on the first side of the recess arranged to guide the first respective side edge of the locking strip into the channel and a second surface on the opposite side of the locking strip which is chamfered away from the channel member to allow the second respective side to remain free of the channel member.

9. The apparatus according to claim 1 wherein the receptacle comprises a hook.

10. The apparatus according to claim 1 wherein the guide body includes a receptacle along its length on one side of the guide slot for receiving an edge of the film sheeting projecting beyond the channel member.

* * * * *